(12) United States Patent
Gawor et al.

(10) Patent No.: US 8,266,589 B2
(45) Date of Patent: Sep. 11, 2012

(54) OPTIMIZING THE HANDLING OF SOURCE CODE REQUESTS BETWEEN A SOFTWARE CONFIGURATION MANAGEMENT (SCM) SYSTEM AND A SOFTWARE INTEGRATED DEVELOPMENT ENVIRONMENT (IDE) USING PROJECTED ANCILLARY DATA

(75) Inventors: Jaroslaw M. Gawor, Apex, NC (US); Paul F. McMahan, Apex, NC (US); Lin Sun, Morrisville, NC (US)

(73) Assignee: International Business Machines Corporation, Armonk, NY (US)

( * ) Notice: Subject to any disclaimer, the term of this patent is extended or adjusted under 35 U.S.C. 154(b) by 1161 days.

(21) Appl. No.: 12/117,335

(22) Filed: May 8, 2008

(65) Prior Publication Data
US 2009/0282388 A1 Nov. 12, 2009

(51) Int. Cl.
*G06F 9/44* (2006.01)
(52) U.S. Cl. ...................................................... 717/120
(58) Field of Classification Search ........... 717/120–122
See application file for complete search history.

(56) References Cited

U.S. PATENT DOCUMENTS

| | | | |
|---|---|---|---|
| 2001/0052108 A1* | 12/2001 | Bowman-Amuah | 717/1 |
| 2003/0158919 A1* | 8/2003 | Fomenko | 709/220 |
| 2007/0006155 A1 | 1/2007 | Maennel et al. | |
| 2008/0120400 A1* | 5/2008 | Keller et al. | 709/223 |
| 2008/0189774 A1* | 8/2008 | Ansari et al. | 726/7 |
| 2009/0064100 A1* | 3/2009 | Schiefer | 717/110 |
| 2009/0177878 A1* | 7/2009 | Gao et al. | 713/100 |

* cited by examiner

*Primary Examiner* — Anna Deng
(74) *Attorney, Agent, or Firm* — Patents on Demand P.A.; Brian K. Buchheit; Scott M. Garrett

(57) ABSTRACT

The present invention can include a solution for optimizing the handling of source code requests by a software configuration management (SCM) system by using projected ancillary data. When a SCM system receives a request for a source code file from a software integrated development environment (IDE), ancillary data can be projected for the requested source code file. Ancillary data can represent supplementary source code files and/or a revision update for an existing source code file. The projected ancillary data can be appended to a response message that already contains the requested source code file. The response message can then be sent to the software IDE.

16 Claims, 3 Drawing Sheets

OPTIMIZING THE HANDLING OF SOURCE CODE REQUESTS BETWEEN A SOFTWARE CONFIGURATION MANAGEMENT (SCM) SYSTEM AND A SOFTWARE INTEGRATED DEVELOPMENT ENVIRONMENT (IDE) USING PROJECTED ANCILLARY DATA

BACKGROUND OF THE INVENTION

The present invention relates to the field of software development, and, more particularly, to optimizing the handling of source code requests between a software configuration management (SCM) system and a software integrated development environment (IDE) using ancillary data.

Software development systems often utilize the advantages of an integrated development environment (IDE) to facilitate source code development and a software configuration management (SCM) system to manage the storage of the source code files. Thus, source code files are frequently communicated between the software IDE and SCM system.

In current approaches, communications, specifically requests for source code files, between the software IDE and SCM system occur in a linear request-response manner. When the software IDE requires a source code file, a request for the file is sent to the SCM system. The SCM system then provides that specific source code file and only that source code file to the IDE.

The quantity of requests to the SCM system could be reduced if the SCM system included a capability to provide the software IDE with additional source code data related to the requested file. Such additional source code data could be stored and accessed by the software IDE without generating requests to the SCM system.

BRIEF SUMMARY OF THE INVENTION

The present invention can be implemented in accordance with numerous aspects consistent with the materials presented herein. One aspect of the present invention can include a method for optimizing the handling of source code requests by a software configuration management (SCM) system by using projected ancillary data. When a SCM system receives a request for a source code file from a software integrated development environment (IDE), ancillary data can be projected for the requested source code file. Ancillary data can represent supplementary source code files and/or a revision update for an existing source code file. The projected ancillary data can be appended to a response message that already contains the requested source code file. The response message can then be sent to the software IDE.

Another aspect of the present invention can include a method for improving source code access in a software integrated development environment (IDE) by using projected ancillary data. A response message from a software configuration management (SCM) system can be received by a software integrated development environment (IDE). The response message can contain a requested source code file and one or more projected ancillary data items. Projected ancillary data items can include supplementary source code files and/or revision updates. The projected ancillary data items can be stored in a memory storage area local to the software IDE. When the software IDE requires an additional source code file, the stored projected ancillary data items can be examined for a match. When a match is found, the software IDE can be provided with the stored ancillary data item from the memory storage area.

Still another aspect of the present invention can include a software configuration management system that improves source code access for a software integrated development environment (IDE) using projected ancillary data. Such a system can include a source code request handling optimizer. The source code request handling optimizer can be configured to provide the software IDE with projected ancillary data items from a software configuration management (SCM) system. The projected ancillary data items can be related to a source code file requested by the software IDE. Projected ancillary data items can include supplementary source code files and/or revision updates.

BRIEF DESCRIPTION OF THE SEVERAL VIEWS OF THE DRAWINGS

There are shown in the drawings, embodiments which are presently preferred, it being understood, however, that the invention is not limited to the precise arrangements and instrumentalities shown.

DETAILED DESCRIPTION OF THE INVENTION

Figure 1:
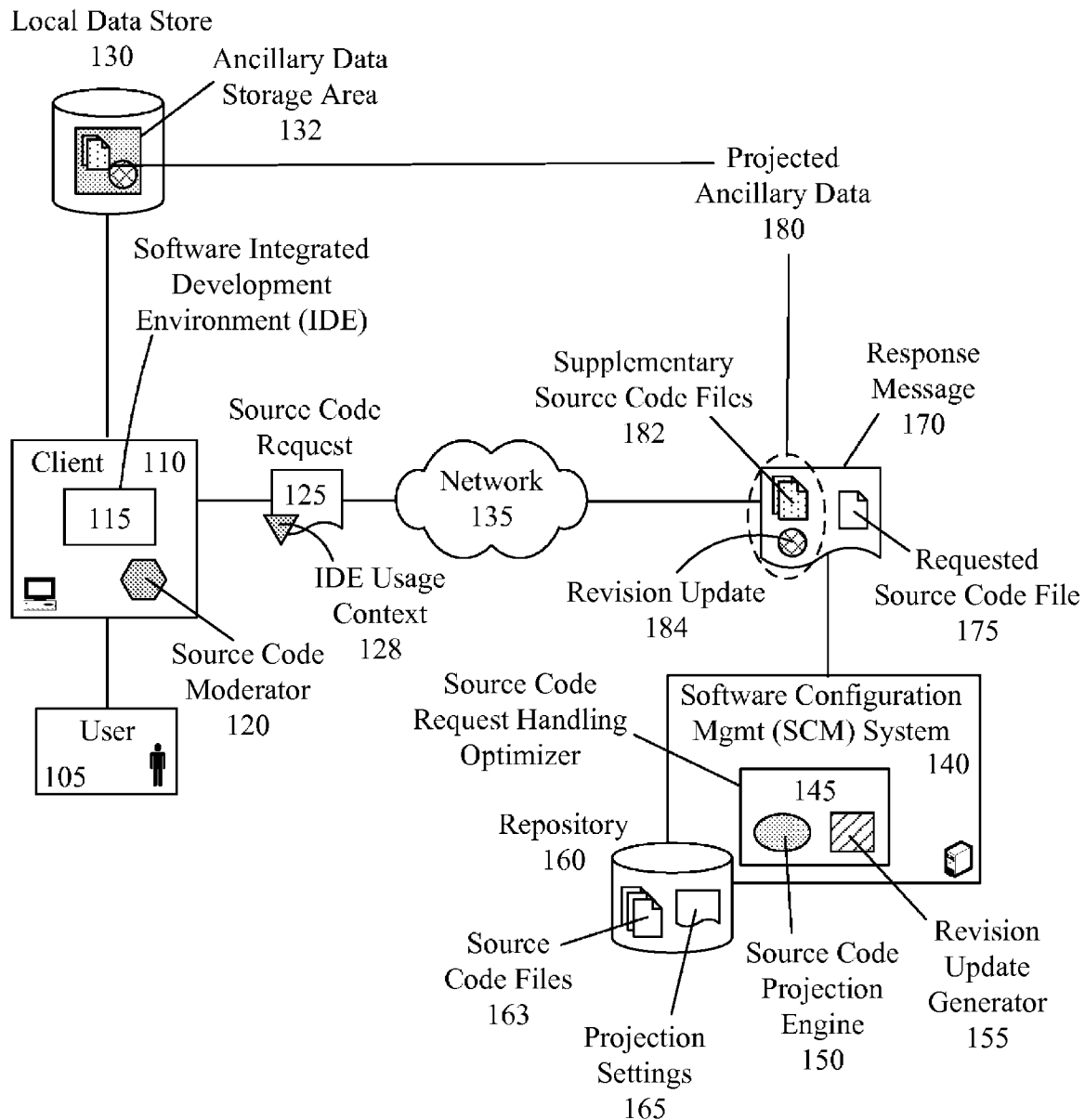
FIG. 1 is a schematic diagram illustrating a system for optimizing the handling of source code requests by a software configuration management (SCM) system using projected ancillary data in accordance with embodiments of the inventive arrangements disclosed herein.

The present invention discloses a solution that optimizes the handling of source code requests between a SCM system and a software IDE by using projected ancillary data. The SCM system can project what ancillary data is applicable for the source code file being requested using projection settings. The projected ancillary data can then be included in the response message that contains the requested source code file. The projected ancillary data can be used by the software IDE, as needed, without generating a request to the SCM system.

The present invention may be embodied as a method, system, or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product on a computer-usable storage medium having computer-usable program code embodied in the medium. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including, but not limited to the Internet, wireline, optical fiber cable, RF, etc.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. Examples of a computer-readable medium include a semiconductor or solid state memory, magnetic tape, a removable computer diskette, a random access memory (RAM), a read-only memory (ROM), an erasable programmable read-only memory (EPROM or Flash memory, a rigid magnetic disk and an optical disk. Current examples of optical disks include compact disk-read only memory (CD-ROM), compact disk-read/write (CD-R/W) and DVD. Other computer-readable medium can include a transmission media, such as those supporting the Internet, an intranet, a personal area network (PAN), or a magnetic storage device. Transmission media can include an electrical connection having one or more wires, an optical fiber, an optical storage device, and a defined segment of the electromagnet spectrum through which digitally encoded content is wirelessly conveyed using a carrier wave.

Note that the computer-usable or computer-readable medium can even include paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The present invention is described below with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

FIG. 1 is a schematic diagram illustrating a system 100 for optimizing the handling of source code requests 125 by a software configuration management (SCM) system 140 using projected ancillary data 180 in accordance with embodiments of the inventive arrangements disclosed herein. In system 100, a SCM system 140 can provide a software integrated development environment (IDE) 115 with projected ancillary data 180 via network 135.

The interaction of the components of system 100 can be initiated when a user 105 performs an action within a software IDE 115 that generates a source code request 125. The software IDE 115 can represent a commercially-available software application for software development that can be configured to operate on a client 110 and communicate with a SCM system 140. The client 110 can also include a source code moderator 120 and a local data store 130.

The source code moderator 120 can be a software component of the SCM system 140 operating on client 110 that can be configured to facilitate the use of projected ancillary data 180 by the software IDE 115. The source code moderator 120 can access an ancillary data storage area 132 contained within the local data store 130 of the client 110. In an alternate embodiment, the source code moderator 120 can operate from within the SCM system 140, performing its functions with the software IDE 115 and ancillary data storage area 132 over the network 135.

When the software IDE 115 generates a source code request 125, the source code moderator 120 can analyze the source code request 125 before it is sent over the network 135 to the SCM system 140. The source code moderator 120 can determine if the source code file 175 being requested is already stored as projected ancillary data 180 within the ancillary data storage area 132. If the requested file is available from the ancillary data storage area 132, then the source code moderator 120 can provide the software IDE 115 with the projected ancillary data item 180.

Otherwise, the source code moderator 120 can convey the source code request 125 to the SCM system 140. When conveying the source code request 125 to the SCM system 140, the source code moderator 120 can append a usage context 128 of the software IDE to the request 125. The usage context 128 can contain data describing the current operating state of the software IDE 115. For example, the usage context 128 can detail the source code files 163 that are currently being used by the software IDE 115, the revisions of the source code files 163 being used, the type of operations being performed by the user 105, and so on.

The SCM system 140 can represent a commercially-available software system configured to manage access to a set of source code files 163. The SCM system 140 can be configured to provide the software IDE 115 with source code files 163 in response to a source code request 125. The SCM system 140 can also include a source code request handling optimizer 145 and a repository 160.

The source code request handling optimizer 145 can be a software component configured to provide the software IDE 115 with projected ancillary data 180 from the SCM system 140 in order to optimize the handling of source code requests 125. Projected ancillary data 180 can represent data items, such as supplementary source code files 182 and/or revision updates 184, that a user 105 may require after receiving the requested source code file 175.

For example, if the user 105 requests Foo.java 175 and Foo.java 175 calls methods from Foo2.java, then the source code request handling optimizer 145 can project that the user 105 will likely request Foo2.java as well. Foo2.java can be sent to the software IDE 115 as a supplementary source code file 180, which eliminates the need for the software IDE 115 to send a separate request 125 for Foo2.java.

The source code request handling optimizer 145 can include a source code projection engine 150 and a revision update generator 155. The source code projection engine 150 can be configured to identify supplementary source code files 182 for the requested source code file 175. To do so, the source code projection engine 150 can utilize a set of projection settings 165.

The projection settings 165 can define conditions and/or criteria that identify a source code file 163 as a supplementary source code file 180. Examples of projection settings 165 can include, but are not limited to, the source code file type, how often the source code file 163 is requested, the size of the source code file 163, the relationship between the requested source code file 175 and the source code file 163, and the like. A projection setting 165 for the previous example can be to include source code files 163 that are directly referenced by the requested source code file 175.

Additionally, the projection settings 165 can also include user-configurable elements that allow a user 105 to customize the inclusion of projected ancillary data 180. For example, a user 105 can define a projection setting 165 to include all source code files 165 for methods/procedures that are within four lines of a code breakpoint. User-configurable elements of the projection settings 165 can be exported by an authoring user 105 and then imported by a secondary user 105. This can allow for users 105 to share elements of the projection settings 165.

The revision update generator 155 can be an element of the source code request handling optimizer 145 that can determine the need to include a revision update 184 in the projected ancillary data 180. The revision update generator 155 can utilize the usage context 128 of the software IDE 115 to determine if the SCM system 140 contains a newer revision of a source code file 163 that is currently being used by the software IDE 115.

For example, a user 105 can be using revision 1 of Foo.java when revision 2 of Foo.java is available in the repository 160 of the SCM system 140. In this situation, the revision update generator 155 can create a revision update 184 for Foo.java.

The revision update 184 can contain the differences between the revisions of a source code file 163. When applied, the revision update 184 can transform the copy of the source code file 163 being used by the software IDE 115 into the newer revision. It should be noted that the use of a revision update 184 eliminates the need for the software IDE 115 to request a copy of the newer revision from the SCM system 140 and for the entirety of the newer revision to be transmitted over the network 135.

Once determined, the source code request handling optimizer 145 can append the projected ancillary data 180 to the response message 170 created by the SCM system 140. The response message 170 can be the vehicle by which the SCM system 140 typically provides the requested source code file 175 to the software IDE 115 for a received request 125.

It is important to emphasize that the SCM system 140 continues to perform its functions of retrieving the requested source code file 175 from the repository 160 and generating of the response message 170. The source code request handling optimizer 145 can expand the contents of the generated return message 170 to include the projected ancillary data 180 to reduce the quantity of subsequent source code requests 125.

When the return message 170 is conveyed to the software IDE 115, the source code moderator 120 can handle the projected ancillary data 180. The source code moderator 120 can store the projected ancillary data 180 in the ancillary data storage area 132. Further, the source code moderator 120 can present the user 105 with the option to apply any included revision updates 184. The source code moderator 120 can apply revision updates 184 as indicated by the user 105.

Network 135 can include any hardware/software/and firmware necessary to convey data encoded within carrier waves. Data can be contained within analog or digital signals and conveyed though data or voice channels. Network 135 can include local components and data pathways necessary for communications to be exchanged among computing device components and between integrated device components and peripheral devices. Network 135 can also include network equipment, such as routers, data lines, hubs, and intermediary servers which together form a data network, such as the Internet. Network 135 can also include circuit-based communication components and mobile communication components, such as telephony switches, modems, cellular communication towers, and the like. Network 135 can include line based and/or wireless communication pathways.

As used herein, presented data stores 130 and 160 can be a physical or virtual storage space configured to store digital information. Data stores 130 and 160 can be physically implemented within any type of hardware including, but not limited to, a magnetic disk, an optical disk, a semiconductor memory, a digitally encoded plastic memory, a holographic memory, or any other recording medium. Data stores 130 and 160 can be a stand-alone storage unit as well as a storage unit formed from a plurality of physical devices. Additionally, information can be stored within data stores 130 and 160 in a variety of manners. For example, information can be stored within a database structure or can be stored within one or more files of a file storage system, where each file may or may not be indexed for information searching purposes. Further, data stores 130 and 160 can utilize one or more encryption mechanisms to protect stored information from unauthorized access.

Figure 2:
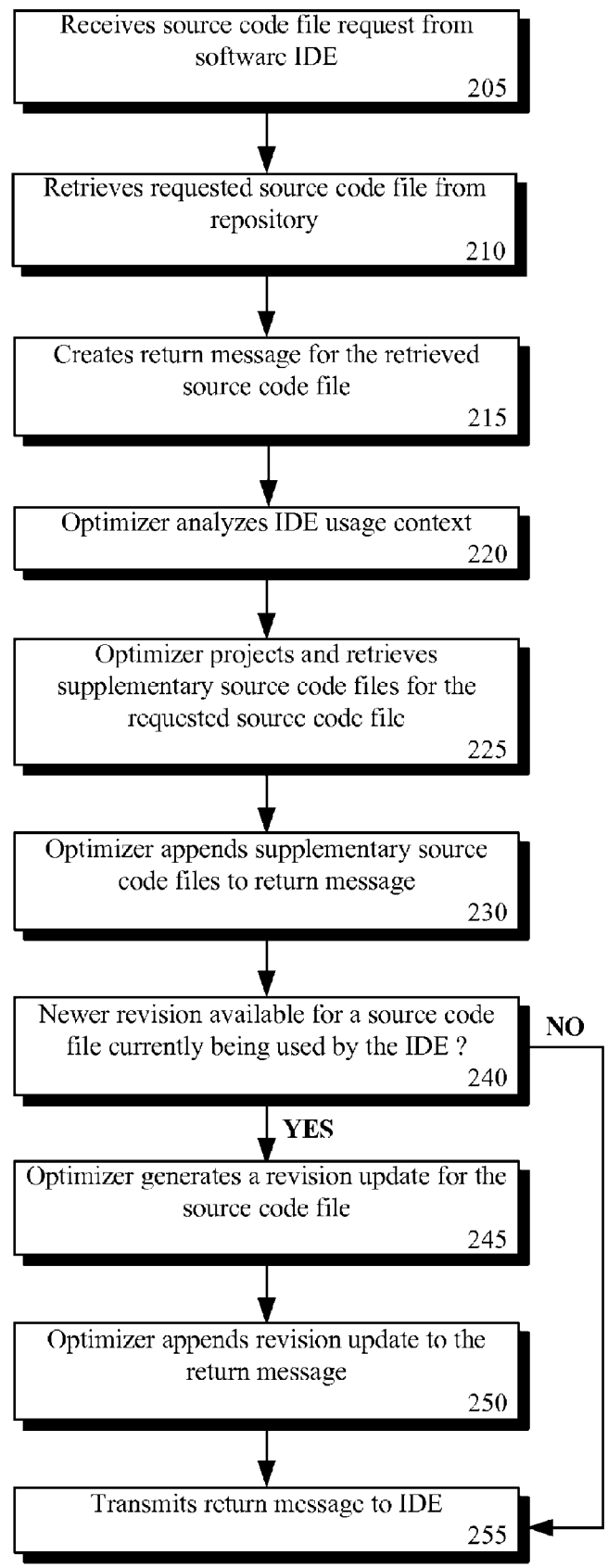
FIG. 2 is a flow chart of a method describing the use of projected ancillary data to optimize the handling of source code requests by a software configuration management (SCM) system in accordance with an embodiment of the inventive arrangements disclosed herein.

FIG. 2 is a flow chart of a method 200 describing the use of projected ancillary data to optimize the handling of source code requests by a software configuration management (SCM) system in accordance with an embodiment of the inventive arrangements disclosed herein. Method 200 can be performed in the context of system 100 or any other system that utilizes projected ancillary data to optimize the handling of source code requests by a SCM system.

Method 200 can begin with step 205 where a source code file request from a software IDE can be received by the SCM system. The requested source code file can be retrieved from a repository in step 210. In step 215, the SCM system can create a return message containing the retrieved source code file.

The source code request handling optimizer can analyze the usage context of the software IDE in step 220. In step 225, the source code request handling optimizer can project and retrieve supplementary source code files for the requested source code file. The supplementary source code files can be appended to the return message in step 230.

In step 240, it can be determined if a newer revision is available for a source code file being used by the software IDE. When a newer revision is available, the source code request handling optimizer can generate a revision update for the source code file in step 245. In step 250, the source code request handling optimizer can append the revision update to the return message.

Upon the completion of step 250 or when it is determined that a newer revision is not available in step 240, step 255 can execute where the return message can be transmitted to the software IDE.

Figure 3:
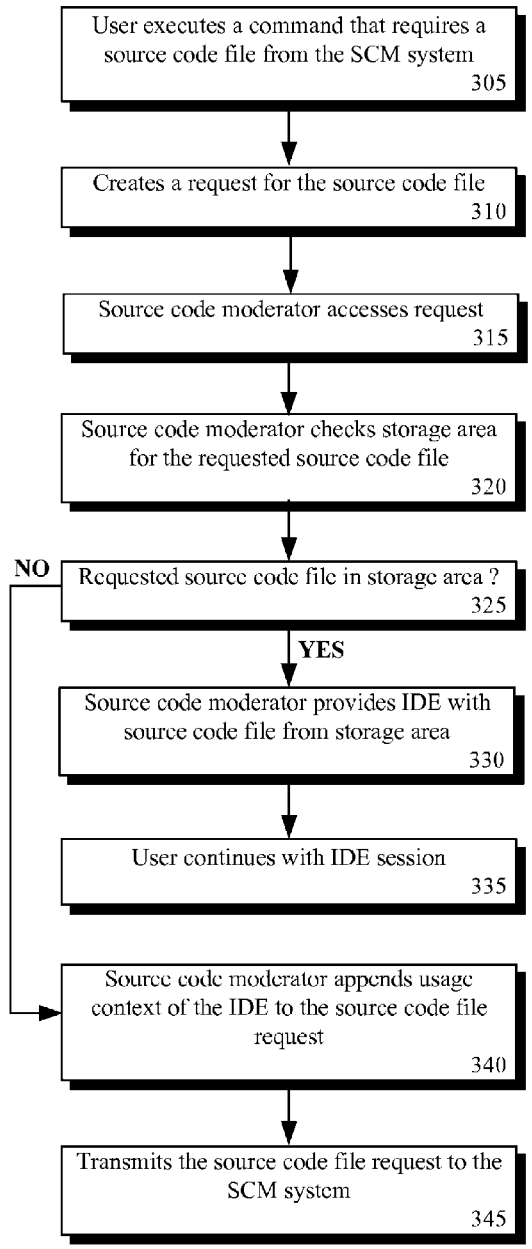
FIG. 3 is a flow chart of methods describing the use of projected ancillary data to optimize the accessing of source code files by a software integrated development environment (IDE) in accordance with an embodiment of the inventive arrangements disclosed herein.
Figure 3:
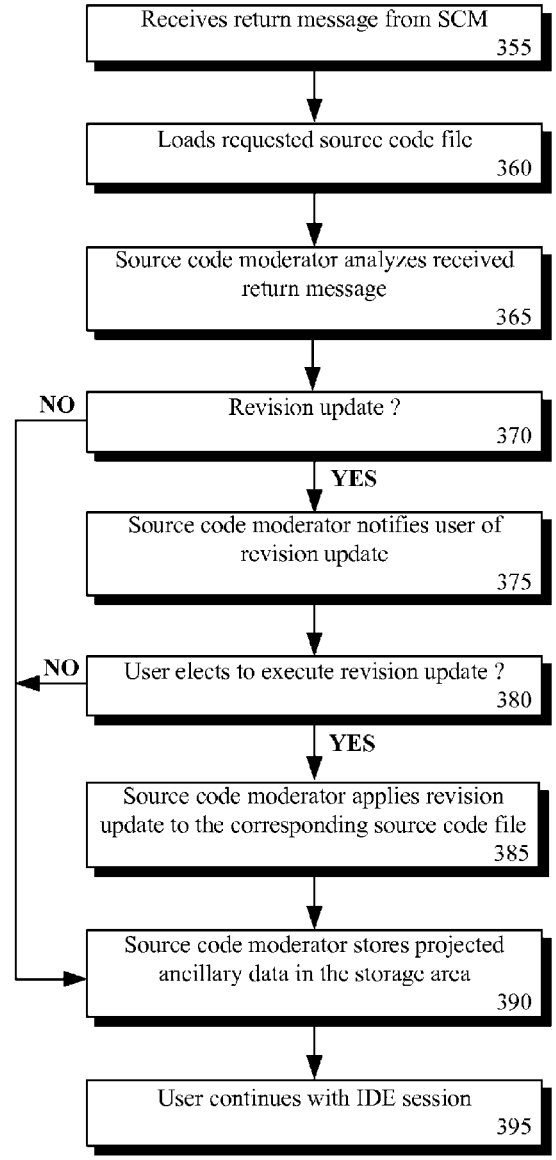

FIG. 3 is a flow chart of methods 300 and 350 describing the use of projected ancillary data to optimize the accessing of source code files by a software integrated development environment (IDE) in accordance with an embodiment of the inventive arrangements disclosed herein. Methods 300 and 350 can be performed in the context of system 100 or any other system that utilizes projected ancillary data to optimize the accessing of source code files by a software IDE.

Method 300 can represent actions occurring when the software IDE generates a source code request for a software configuration management (SCM) system. Method 300 can begin with step 305 where a user can execute a command that requires a source code file from the SCM system. The software IDE can create a request for the source code file in step 310.

In step 315, the source code moderator can access the source code file request. The source code moderator can check the ancillary data storage area for the requested source code file in step 320. In step 325, it can be determined if the requested source code file is present in the ancillary data storage area.

When the requested source code file is present in the ancillary data storage area, step 330 can execute where the source code moderator can provide the software IDE with the source code file from the ancillary data storage area. The user can then continue with their software IDE session in step 335.

When the requested source code file is not present in the ancillary data storage area, flow can proceed to step 340 where the source code moderator can append the usage context of the software IDE to the source code file request. In step 345, the source code file request can be transmitted to the SCM system.

Method 350 can represent actions occurring when the software IDE receives a return message from a SCM system. Method 350 can begin with step 355 where the software IDE can receive a return message from the SCM system. The software IDE can load the requested the source code file in step 360.

In step 365, the source code moderator can analyze the received return message. The source code moderator can determine if the return message contains a revision update in step 370. When a revision update is present in the return message, step 375 can execute where the source code moderator can notify the user of the revision update.

The user can determine whether to execute the revision update in step 380. When the user elects to execute the revision update, step 385 can execute where the source code moderator applies the revision update to the corresponding source code file being used by the software IDE.

Step 390 can execute upon the completion of step 385, when the user elects to not execute the revision update in step 380, or when it is determined that the return message does not contain a revision update in step 370. In step 390, the source code moderator can store the projected ancillary data in the ancillary data storage area. The user can continue with their software IDE session in step 395.

The diagrams in FIGS. 1-3 illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method for optimizing the handling of source code requests by a software configuration management (SCM) system using projected ancillary data comprising:

receiving a request for a source code file from a software integrated development environment (IDE) by a software configuration management (SCM) system;

generating a response message for the request, wherein the response message contains the requested source code file;

projecting ancillary data for the requested source code file, wherein the ancillary data comprises at least one of a supplementary source code file and a revision update;

appending the projected ancillary data to the response message; and transmitting the response message with the projected ancillary data to the software IDE;

wherein when the ancillary data being projected is a supplementary source code file, the projecting step further comprises:

accessing a plurality of projection settings, wherein the plurality of projection settings define criteria for projecting at least one supplementary source code file;

identifying the at least one supplementary source code file based upon the plurality of projection settings for the requested source code file; and retrieving the at least one identified supplementary source code file from a source code repository; and wherein when the ancillary data being projected is a revision update, the projecting step further comprises:

ascertaining a usage context for the software IDE, wherein the usage context details source code files and associated revision information currently in use by the software IDE;

identifying an existence of at least one newer revision within the SCM system for the source code files in use by the software IDE; and for each identified newer revision, generating the revision update for the source code file, wherein the revision update defines at least one difference between the newer revision in the SCM system and the source code file in use by the software IDE.

2. The method of claim 1, wherein the criteria defined by the plurality of projection settings comprise at least one of a size of the supplementary source code file, a request frequency of the supplementary source code file, a metadata tag value associated with the supplementary source code file, a proximity relationship of the supplementary source code file to a user-identified code element, and a user-executed command within the software IDE.

3. The method of claim 1, wherein an execution of the revision update by the software IDE applies the at least one difference to the source code file in use by the software IDE, whereby transmission of an entirety of the newer revision is unnecessary.

4. The method of claim 1, wherein the usage context is contained within the request for the source code file.

5. The method of claim 1, wherein the usage context is obtained by additional communication with the software IDE.

6. The method of claim 1, wherein the ascertaining and appending steps are conducted by a source code request handling optimizer, wherein the source code request handling optimizer is a software component of the SCM system.

7. The method of claim 1, wherein said steps of claim 1 are performed by at least one machine in accordance with at least one computer program stored in a computer readable media, said computer programming having a plurality of code sections that are executable by the at least one machine.

8. A method for improving source code access in a software integrated development environment (IDE) using projected ancillary data comprising:

receiving a response message from a software configuration management (SCM) system for a source code file request by a software integrated development environment (IDE), wherein the response message contains a requested source code file and at least one projected ancillary data item for the requested source code file, wherein the at least one projected ancillary data item comprises at least one of a supplementary source code file and a revision update, wherein when the projected ancillary data is a supplementary source code file, the supplementary source code file being projected by:

accessing a plurality of projection settings, wherein the plurality of projection settings define criteria for projecting at least one supplementary source code file, identifying the at least one supplementary source code file based upon the plurality of projection settings for the requested source code file, and retrieving the at least one identified supplementary source code file from a source code repository, and wherein when the projected ancillary data being projected is a revision update, the revision update is projected by:

ascertaining a usage context for the software IDE, wherein the usage context details source code files and associated revision information currently in use by the software IDE, identifying an existence of at least one newer revision within the SCM system for the source code files in use by the software IDE, and for each identified newer revision, generating the revision update for the source code file, wherein the revision update defines at least one difference between the newer revision in the SCM system and the source code file in use by the software IDE;

storing the at least one projected ancillary data item in a memory storage area local to the software IDE;

when the software IDE requires an additional source code file, examining the at least one stored projected ancillary data item for a match to the additional source code file; and when a match is found, providing the matching stored ancillary data item to the software IDE from the memory storage area.

9. The method of claim 8, further comprising:

when a match is nonexistent, requesting the additional source code file from the SCM system.

10. The method of claim 8, wherein, when the ancillary data item being provided is the revision update, the providing step further comprises:

applying the revision update to a source code file currently in use by the software IDE, wherein the source code file being used by the software IDE is modified to match a newer revision of the source code file contained within the SCM system.

11. The method of claim 8, wherein the storing, determining, and providing steps are performed by a source code moderator, wherein the source code moderator is a software component of the SCM system.

12. A software configuration management system that improves source code access for a software integrated development environment (IDE), the software configuration management system stored in a computer memory comprising:
  a source code request handling optimizer configured to provide a software integrated development environment (IDE) with at least one projected ancillary data item from a software configuration management (SCM) system, wherein the at least one projected ancillary data item is related to a source code file requested by the software IDE, and, wherein the at least one projected ancillary data item comprises at least one of a supplementary source code file and a revision update;
  the source code request handling optimizer configured to append the ancillary data to a response message of the SCM system that corresponds to the source code request, wherein the response message contains the requested source code file;
  wherein when the at least on projected ancillary data item comprises a supplementary source code file, the source code request handling optimizer further comprises:
    a plurality of projection settings configured to define criteria for projecting at least one supplementary source code file, and a source code projection engine configured to utilize the plurality of projection settings to identify at least one supplementary source code file, and
  wherein when the at least on projected ancillary data item comprises a revision update, the source code request handling optimizer further comprises:
    a revision update generator configured to ascertain a usage context for the software IDE, wherein the usage context details source code files and associated revision information currently in use by the software IDE, to identify an existence of at least one newer revision within the SCM system for the source code files in use by the software IDE, and to generate the revision update for a source code file being used by the software IDE, wherein the revision update contains at least one difference between a revision of the source code file being used by the software IDE and a newer revision of the source code file contained within the SCM system.

13. The software configuration management system of claim 12, further comprising:
  a source code moderator configured to facilitate a use of the ancillary data by the software IDE, wherein the source code moderator operates local to the software IDE.

14. The software configuration management system of claim 12, wherein the criteria defined by the plurality of projection settings comprise at least one of a size of the supplementary source code file, a request frequency of the supplementary source code file, a metadata tag value associated with the supplementary source code file, a proximity relationship of the supplementary source code file to a user-identified code element, and a user-executed command within the software IDE.

15. The software configuration management system of claim 12, wherein the plurality of projection settings comprises at least one user-configurable criteria associated with a user of the SCM system, wherein import and export functions are able to be performed upon the at least one user-configurable criteria.

16. The software configuration management system of claim 13, wherein the requested source code file and supplementary source code files are contained within a source code repository managed by the SCM system.

* * * * *